US007174808B2

(12) United States Patent
Khachatoorian

(10) Patent No.: US 7,174,808 B2
(45) Date of Patent: Feb. 13, 2007

(54) HAND TOOL

(75) Inventor: Zareh Khachatoorian, Northridge, CA (US)

(73) Assignee: JPJ Investment Holding Corporation, Carson City, NV (US)

(*) Notice: Subject to any disclaimer, the term of this patent is extended or adjusted under 35 U.S.C. 154(b) by 88 days.

(21) Appl. No.: 11/037,871

(22) Filed: Jan. 18, 2005

(65) Prior Publication Data

US 2005/0284264 A1 Dec. 29, 2005

Related U.S. Application Data

(60) Provisional application No. 60/582,437, filed on Jun. 23, 2004.

(51) Int. Cl.

*B25D 1/00* (2006.01)
*B25B 7/00* (2006.01)
*B25B 23/16* (2006.01)
*B23G 1/00* (2006.01)

(52) U.S. Cl. ......................... 81/20; 81/427.5; 81/177.5

(58) Field of Classification Search .................... 81/20, 81/427.5, 177.5; 30/308; 29/432, 509; D8/76, D8/77, 78

See application file for complete search history.

(56) References Cited

U.S. PATENT DOCUMENTS

| | | | | |
|---|---|---|---|---|
| 2,318,193 | A * | 5/1943 | Branham | 403/282 |
| 4,352,381 | A * | 10/1982 | Provi | 30/308.1 |
| D340,177 | S * | 10/1993 | Key | D8/75 |
| D378,656 | S * | 4/1997 | Maine | D8/78 |
| 5,735,630 | A * | 4/1998 | Keathley et al. | 403/334 |
| 6,314,837 | B1 * | 11/2001 | Nevaril | 81/20 |
| 6,363,817 | B1 * | 4/2002 | Lamond et al. | 81/22 |
| 6,564,849 | B1 * | 5/2003 | Kusner | 157/1.3 |
| 6,729,877 | B2 * | 5/2004 | Rahman | 433/141 |

* cited by examiner

*Primary Examiner*—Lee D. Wilson
*Assistant Examiner*—Alvin J. Grant
(74) *Attorney, Agent, or Firm*—Edmonds PC; Robb D. Edmonds

(57) ABSTRACT

An apparatus for locking the head of a hand tool to the handle of the tool. The apparatus generally includes a tapered handle with one or more groove cut into the handle at the tool end of the handle. The grooves are then filled with a compressible material. The head of the tool (such as a pick axe, a hammer, an axe, etc.) is then placed over handle and moved over the grooves to the end. The compressible material will lock the head into place, fixing a longstanding problem with hand tools of the heads coming loose.

16 Claims, 2 Drawing Sheets

HAND TOOL

CROSS-REFERENCE TO RELATED APPLICATIONS

This application claims benefit of U.S. provisional patent application Ser. No. 60/582,437, filed Jun. 23, 2004, which is herein incorporated by reference.

BACKGROUND OF THE INVENTION

1. Field of the Invention

The present invention relates to hand tools; and more specifically the invention relates to locking head for tools at the end of handles; more specifically still, the invention relates to a locking head for a pick axe.

2. Description of the Related Art

Historically hand tools such as axes, pick axes, hammers, etc., have had a tapered handle that locks the head of the tool at the end of the handle. Typically, the handle is simply a shaft which is tapered to a larger diameter at the end where the tool is located. The taper of the handle matches the inside surface of the tool head so that a frictional arrangement is possible between them. In order to secure the tool at the end of the handle, the tool collar is placed around the handle and urged down the shaft to the tapered end. The head is locked into the handle by the interference fit between the tapered surfaces.

One problem arising in the prior art designs is due to the frictional fit and its likelihood of loosening when the tool is in use. For example after use and wear on the tool, the head can become loose and slide down the handle. The use of cement between the handle and head tends to become ineffective over time. The loosening heads can cause serious damage to people using the hand tool and to personal property.

Therefore, a need exists for an improved apparatus and method for locking the head of a hand tool to the handle.

SUMMARY OF THE INVENTION

Embodiments of the present invention are generally directed to an apparatus for locking the head of a hand tool to the handle of the tool. In one embodiment, the apparatus includes a handle with a tapered tool end and a gripping end. The head of the tool has a correspondingly tapered inner surface and is placed on the handle and urged towards the tool end of the handle. The head of the tool slides into place and becomes fixed on the handle due to the tapered surfaces of the handle and tool head. With the head in place, a portion of the compressible material between the handle and the head becomes compressed. However, a portion of the compressible material not covered by the head retains its non compressed thickness and serves as a stop to prevent the tool head from moving back down the handle.

In yet another embodiment, the tool end of the handle has one or more grooves formed in the handle. Each groove is filled with a compressible material that runs substantially the length of the groove.

In yet another embodiment, the present invention is directed to a method for locking a tool to the end of a handle. The tool is locked by placing one or more compressible members on the tool end of a handle and placing the tool around the handle. The tool is then moved so that the tool is over a portion of the compressible member. Friction is used to cause the compressible member to lock the tool into place.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF AN EMBODIMENT

Figure 1:
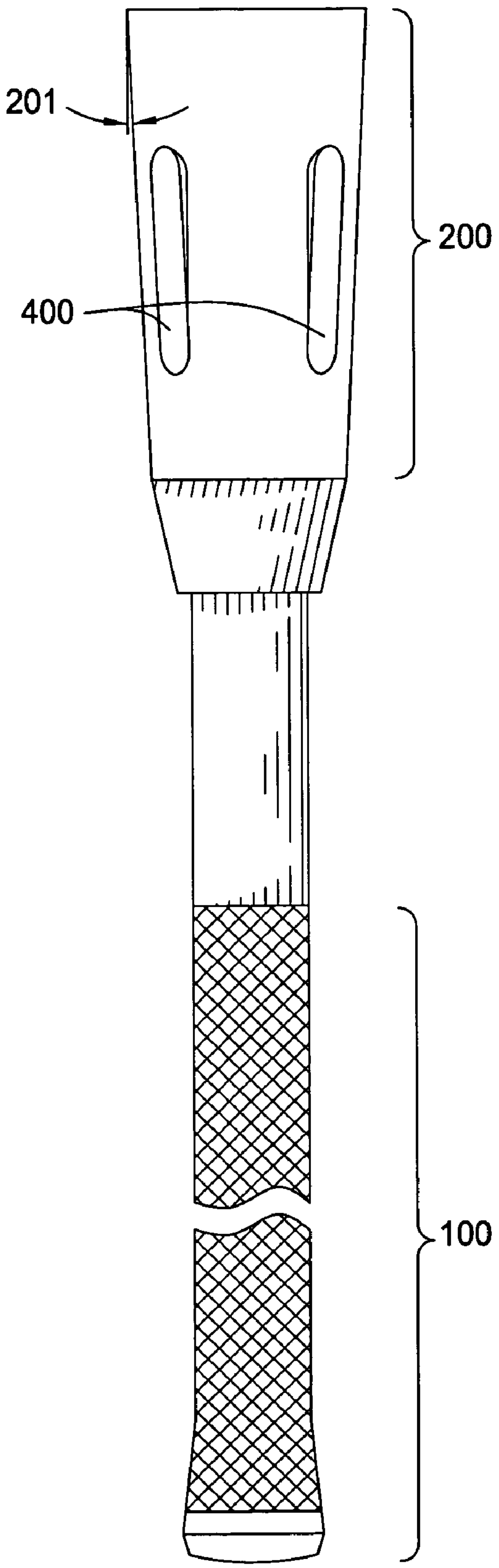
FIG. 1 illustrates a handle of a hand tool, which is configured to incorporate embodiments of the present invention.

FIG. 1 illustrates a schematic cross sectional view of a handle of a hand tool which is configured to incorporate embodiments of the present invention. The handle consists of an end for gripping the handle (100) and an end for a tool head (200). The tool head end (200) of the handle is tapered to a larger outer diameter along its length (201) to accommodate a collar portion (301) (shown in FIG. 2) of the tool head (300). The handle further includes one or more grooves (400) formed length wise into the handle.

The grooves (400) in the handle at least partially house a compressible member (401). The depth of the groove (400) can be any depth so long as the compressible member (401) fits within the groove (400). The grooves (400) are long enough so that a portion of the groove (400) and a corresponding portion of the compressible member (401) will be outside the collar (301) of the tool head (300) while a portion will be under the collar (301) of the tool head (300) when the tool is assembled. In the embodiment shown there are four grooves (400) spaced symmetrically around the handle. It should be appreciated that the one or more grooves (400) could be at any location around the handle so long as a portion of the groove (400) extends under the collar of the tool head.

The compressible member (401) can be made of any material so long as it will compress and allow the collar (301) to slide over it as the tool is assembled. The compressible member (401) can be attached to the handle itself in the groove, or just rest in the groove (400). It should be appreciated that the compressible member (401) could be used without a groove by placing it on the smooth surface of the handle. The compressible member (401) will assist in locking the tool head (300) into place on the handle as described below.

Figure 2:
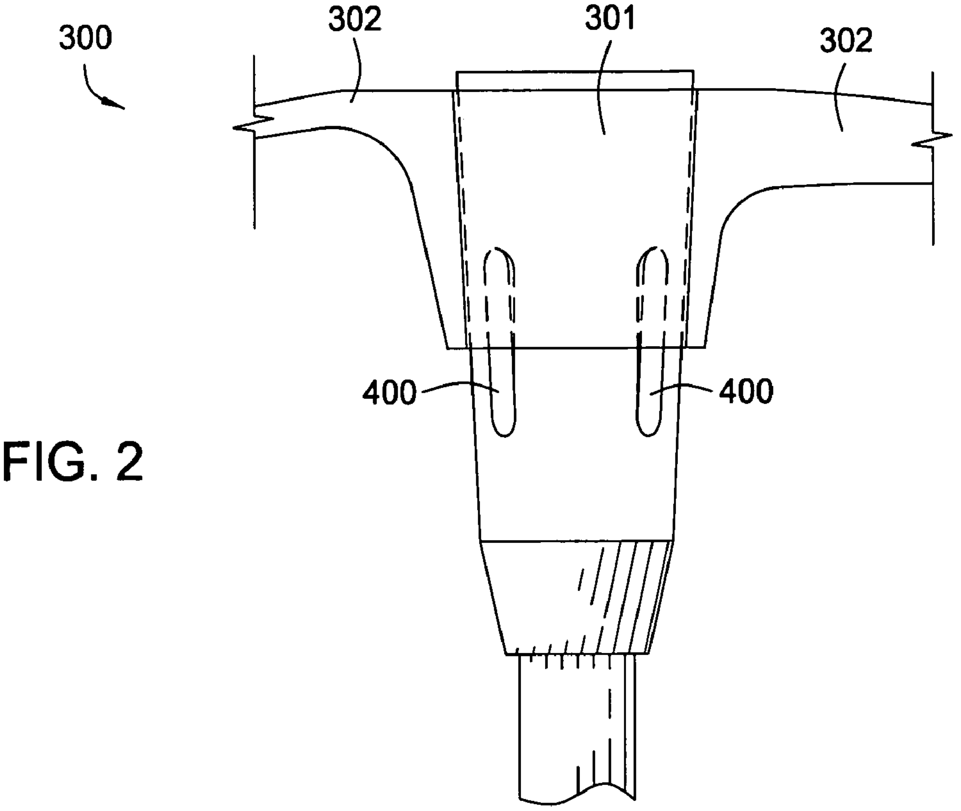
FIG. 2 illustrates a tool end of the hand tool, with a tool head locked into place.
Figure 3:
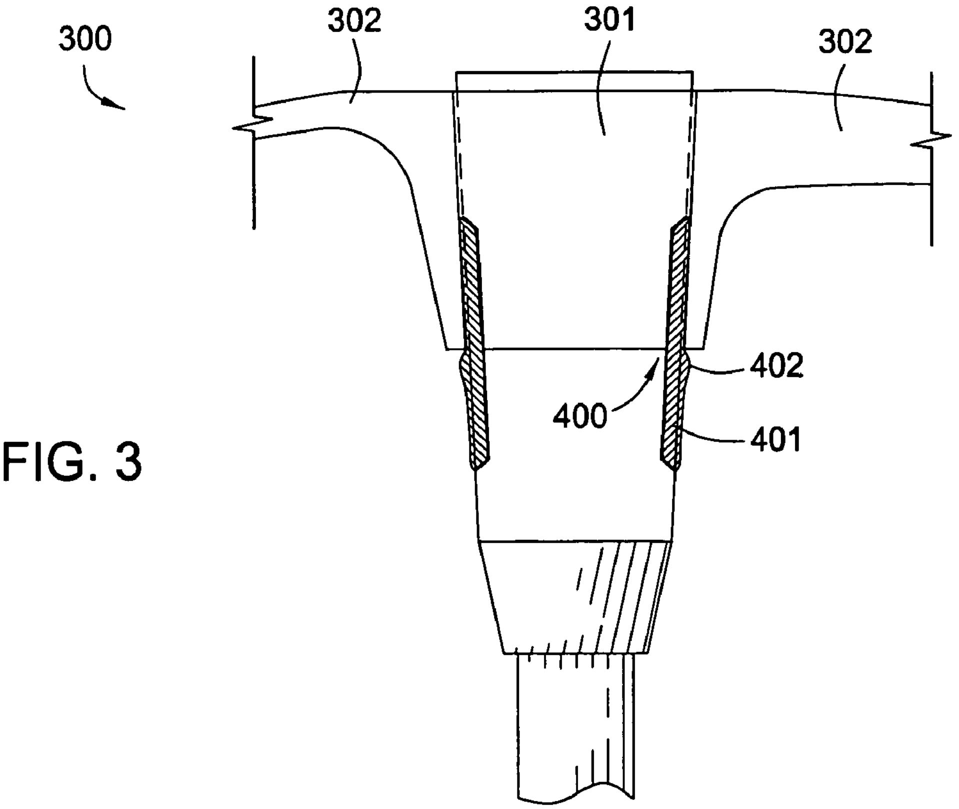
FIG. 3 illustrates a cross sectional view of the handle with the head of the hand tool locked in place by a compressible member.

FIG. 2 is a schematic view of the handle (200) of the hand tool with the head (300) locked in place. The tool head (300) in this embodiment is a pick axe (302), but it could be any type of tool that is located on the end of a handle (hammer, axe, etc.). In order to assemble the tool, the collar (301) of the tool head is placed around the handle, typically on the gripping end (100). The collar (301) is then moved down the handle toward the tool head end (200) and the one or more grooves (400). The collar (301) slides over the one or more grooves (400) containing the compressible member (401) and will then be locked into place by frictional force near the end of the handle. At this point a portion of the compressible member (401) will be under the collar (301) and a portion will extend from the underside of the collar (301) as shown in FIG. (3).

With the tool head (300) in place, the compressible member (401) assists in locking the tool head (300) to the handle. The compression of a portion of the compressible member (401) between the collar and the tool head causes a portion of the compressible member (401) at the edge of the collar (301) to rise up as shown in FIG. (3). The raised portion (402) of the compressible member (401) forms a stop and assists in locking the tool head (300) on the handle.

While the foregoing is directed to embodiments of the present invention, other and further embodiments of the invention may be devised without departing from the basic scope thereof, and the scope thereof is determined by the claims that follow.

The invention claimed is:

1. A hand tool, comprising:

a handle, the handle having a first end and tapering to a larger diameter at a second end and at least one groove cut into the handle;

a head, the head having an aperture therethrough, the aperture having a tapered inner surface such that the head can be frictionally held at the second end; and a compressible member located within the groove, the compressible member having a first compressed portion between the head and the taper at the second end and a non-compressed portion extending from the interface between the head and the tapered portion and preventing movement of the head in the direction of the first end.

2. The apparatus of claim 1, wherein the at least one grove runs axially with the handle.

3. The apparatus of claim 2, wherein when the hand tool is assembled, a portion of the one or more grooves is located under the head and a portion of the one or more grooves extends from under the head.

4. The apparatus of claim 1, wherein the compressible member is constructed and arranged to form a stop at the interface, to further lock the head in place.

5. The apparatus of claim 1, wherein the hand tool is a pick axe.

6. The apparatus of claim 1, wherein the hand tool is a hammer.

7. The apparatus of claim 1, wherein the hand tool is an axe.

8. The apparatus of claim 1, wherein the groove defines a hollowed out volume from the second end of the handle.

9. The apparatus of claim 1, wherein a portion of the compressible member is compressed within the at least one groove.

10. A method for locking a head to a handle, comprising:

placing one or more compressible members, into a groove on a second end of a handle, the handle having a first end and tapering to a larger outer diameter at the second end;

placing a head around the second end of the handle, the head having an aperture therethrough, the aperture having a tapered inner diameter corresponding to the taper at the second end of the handle such that the head can be frictionally held on the second end, around the handle;

moving the head so that the head is over a portion of the compressible member; and further using friction on the head and permit the compressible member to form a stop at an edge of the head to lock the head in place.

11. The method in claim 10, wherein the head is a pick axe.

12. The method in claim 10, wherein the head is a hammer.

13. The method in claim 10, wherein the head is an axe.

14. The method in claim 10, further including compressing a first portion of the compressible member with the tapered inner diameter of the head and allowing a second portion of the compressible member to remain uncompressed.

15. The method in claim 14, wherein the first portion of the compressible member is between the aperture of the head and the second end of the handle and the second portion of the compressible member extends beyond the aperture towards the first end of the handle.

16. The method of claim 10, wherein the groove defines a hollowed out volume from the handle.

* * * * *